United States Patent
Berke et al.

(10) Patent No.: US 9,852,060 B2
(45) Date of Patent: Dec. 26, 2017

(54) STORAGE CLASS MEMORY (SCM) MEMORY MODE CACHE SYSTEM

(71) Applicant: Dell Products L.P., Round Rock, TX (US)

(72) Inventors: Stuart Allen Berke, Austin, TX (US); John E. Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 15/087,589

(22) Filed: Mar. 31, 2016

(65) Prior Publication Data

US 2017/0286285 A1 Oct. 5, 2017

(51) Int. Cl.
*G06F 12/02* (2006.01)
*G06F 12/0804* (2016.01)

(52) U.S. Cl.
CPC ...... *G06F 12/0238* (2013.01); *G06F 12/0804* (2013.01); *G06F 2212/205* (2013.01); *G06F 2212/225* (2013.01)

(58) Field of Classification Search
None
See application file for complete search history.

(56) References Cited

U.S. PATENT DOCUMENTS

2006/0053311 A1* 3/2006 Chary ................... G06F 1/3203
                                                                  713/300
2014/0351518 A1* 11/2014 Chang ................. G06F 12/0811
                                                                  711/122

OTHER PUBLICATIONS

"Intel® Look Inside™: Apache Pass Security for Purley Server," Mar. 2015, 16 Pages, Document No. 557292, Revision No. 1.0, Intel Corporation.
"Intel®, Intel NVM DIMM Management Software-Firmware, Interface Specification," Mar. 2015, 26 Pages, Revision 0.86, Document No. 554415, Intel Corporation.

* cited by examiner

*Primary Examiner* — Duc Doan
(74) *Attorney, Agent, or Firm* — Haynes and Boone, LLP

(57) ABSTRACT

An SCM memory mode NVDIMM-N cache system includes an SCM subsystem, and an NVDIMM-N subsystem having at volatile memory device(s) and non-volatile memory device(s). A memory controller writes data to the volatile memory device(s) and, in response, updates a cache tracking database. The memory controller then writes a subset of the data to the SCM subsystem subsequent to the writing of that data to the volatile memory device(s) and, in response, updates the cache tracking database. The memory controller then receives a shutdown signal and, in response, copies the cache tracking database to the volatile memory device(s) in the NVDIMM-N subsystem. The NVDIMM-N subsystem then copies at least some of the data and the cache tracking database from the volatile memory device(s) to the non-volatile memory device(s) prior to shutdown. The data and the cache tracking database may then be retrieved from non-volatile memory device(s) when the system is restored.

20 Claims, 8 Drawing Sheets

STORAGE CLASS MEMORY (SCM) MEMORY MODE CACHE SYSTEM

BACKGROUND

The present disclosure relates generally to information handling systems, and more particularly to a cache system used with Storage Class Memory (SCM) in an information handling system for operation in an SCM memory mode.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Recently, a new type of non-volatile memory technology (referred to below as "Storage Class Memory" or "SCM") has been developed for information handling systems (e.g., SCM initially marketed under the brand names "3DXPOINT" and "OPTANE" by INTEL® Corporation of Redmond, Wash., United States, and MICRON® Technology Incorporated of Boise, Id., United States). While technical details of SCM devices are not entirely clear, it is clear that SCM devices will provide non-volatile memory with storage class attributes. For example, individual cells in SCM devices will not require a transistor, allowing for a packing density that is expected to be 8-10 times greater than Dynamic Random Access Memory (DRAM) and allowing for much higher storage capacities than physically-comparable sized DRAM (e.g., hundreds of gigabytes, terabytes, etc.) Furthermore, write durability is expected to be up to 1000 times higher than flash memory. However, it appears that the benefits of SCM devices will come with performance limitations. For example, SCM devices are expected to have a latency that is an order of magnitude (or more) slower than DRAM, and a bandwidth that is approximately 4 times slower than DRAM.

Initial implementations of this new memory technology in memory systems, such as the 3DXPOINT SCM devices discussed above, will include three modes of operations: a storage mode, an application direct mode, and a memory mode. In the storage mode the SCM devices are to be treated like conventional mass storage device such as a hard disk (HD) or solid state device (SSD) and accessed via block Input/Output (I/O) actions, while in the application direct mode the SCM devices are to have portions allocated to particular applications and accessed via random load/store actions. In both the storage mode and application direct mode the memory system including the SCM devices can be considered "persistent", as data is written directly to the non-volatile SCM devices and thus will not be erased in the event of, for example, a power failure. This persistence of memory systems including SCM devices is available in the storage and application direct modes due to the speed of data writes to the SCM devices not being a priority. In other words, the storage and application direct modes provide for the use of the SCM devices in a manner that their performance limitations are not an issue (i.e., they are used for relatively long term storage like conventional mass storage devices, and not for quick data storage and access as is required with conventional DRAM memory devices.)

However, in the memory mode, the SCM devices are provided in the memory system that is treated like a conventional DRAM memory system that must provide for quick data storage and access by the processing system. Because SCM devices suffer from the performance limitations discussed above, a cache made up of Registers DIMM (RDIMM) devices or Load Reduced DIMM (LRDIMM) devices is provided in memory systems that have SCM devices operating in memory mode in order for the memory system to provide the quick data storage by the processing system. For example, in a memory system with SCM devices operating in memory mode, data reads and writes are initially written to the RDIMM/LRDIMM devices (which provide much higher write speeds than the SCM devices) that essentially act as a write-back cache, with a cache controller implementing a cache line replacement algorithm (e.g., least recently used (LRU)) to remove the cacheline from the cache. If a replaced cacheline was modified (i.e., previously written), that cacheline is written back by the cache controller to the SCM device (and optionally de-allocated from the RDIMM/LRDIMM devices). However, because RDIMM/LRDIMM devices are volatile memory devices, memory systems including SCM devices operating in memory mode cannot be considered persistent, as data that is written to the volatile RDIMM/LRDIMM device but not yet written back to the non-volatile SCM devices will be lost in the event of, for example, a power failure. Given the high storage capacities of SCM devices and the resulting large amounts of data that may be written to the volatile RDIMM/LRDIMM cache in memory mode, the use of a memory system with SCM devices in memory mode risks the loss of large amounts of data provided to that memory system.

Accordingly, it would be desirable to provide an improved SCM memory mode memory system.

SUMMARY

According to one embodiment, an Information Handling System (IHS) includes a chassis; a memory system that is located in the chassis and that includes: a Storage Class Memory (SCM) subsystem; and a Non-Volatile Dual Inline Memory Module (NVDIMM-N) subsystem including at least one volatile memory device and at least one non-volatile memory device; a processing system that is coupled to the memory system and that is configured to: write a plurality of data to the at least one volatile memory device in the NVDIMM-N subsystem and, in response, update a cache tracking database; write a first subset of the plurality of data to the SCM subsystem subsequent to the writing of the plurality of data to the at least one volatile memory device in the NVDIMM-N subsystem and, in response, update the cache tracking database; and receive a shutdown signal and, in response, copy the cache tracking database to the at least one volatile memory device in the NVDIMM-N subsystem, wherein the NVDIMM-N subsystem is configured to copy at least some of the plurality of data and the cache tracking database from the at least one volatile memory device in the NVDIMM-N subsystem to the at least one non-volatile memory device in the NVDIMM-N subsystem prior to a shutdown associated with the shutdown signal.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
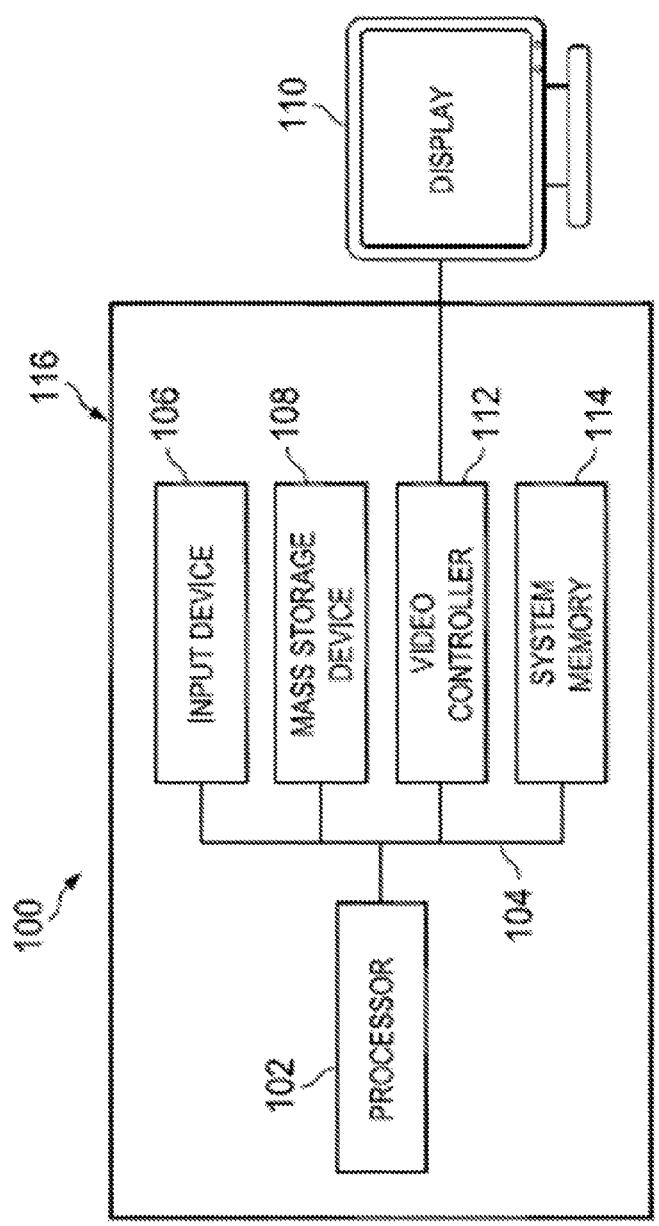
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
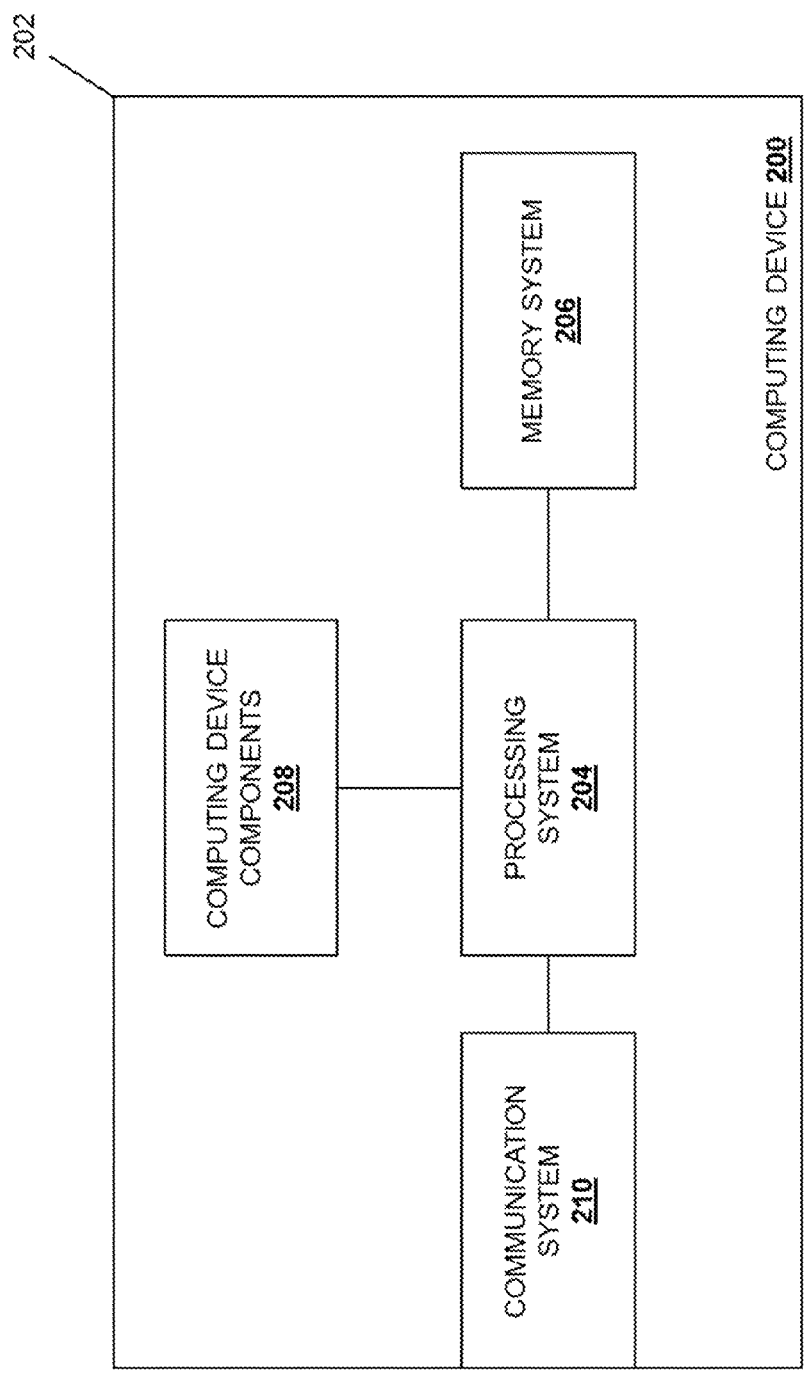
FIG. 2 is a schematic view illustrating an embodiment of a computing device.

Referring now to FIG. 2, an embodiment of a computing device 200 is illustrated. In an embodiment, the computing device 200 may be the IHS 100 discussed above with reference to FIG. 1 and/or may include some or all of the components of the IHS 100. In specific embodiments discussed below, the computing device 200 is described as a server, although other computing devices such as desktop computing devices, laptop/notebook computing devices, tablet computing devices, mobile phones, networking devices (e.g., switches, router, etc.), storage systems, and/or other computing devices known in the art may benefit from the teachings of the present disclosure and thus will fall within its scope. The computing device 200 includes a chassis 202 that houses the components of the computing device 200, only some of which are illustrated in FIG. 2. Furthermore, while the components of the computing device 200 are illustrated as housed in a single chassis, the computing device 200 may be distributed across multiple chassis while remaining within the scope of the present disclosure.

In the illustrated embodiment, the chassis 202 houses a processing system 204 that may include one or more of the processors 102 discussed above with reference to FIG. 1, a Basic Input/Output System (BIOS), and/or other processing system components known in the art. In some embodiments, the BIOS discussed below may be provided by a Unified Extensible Firmware Interface (UEFI) system while remaining within the scope of the present disclosure. Thus, while UEFI is known in the art as a specification that has been provided to replace BIOS and that defines a software interface between an operating system and platform firmware provided on computing devices, the discussions of the BIOS functionality below are intended to encompass UEFI system functionality as well (i.e., a UEFI system may provide the BIOS that performs the functionality discussed below while remaining within the scope of the present disclosure.) The chassis 202 also houses a memory system 206 that is coupled to the processing system and described in further detail below. The chassis 202 may also house other computing device components 208 that are coupled to the processing system 204 and that may include power systems, operating systems, application system, and/or a variety of computing device components known in the art that are configured to provide the functionality discussed below. The chassis 202 also houses a communication system 210 that is coupled to the processing system 204 that may include a Network Interface Controller (NIC), a wireless communication subsystem, and/or other communication systems known in the art that allow the computing device to couple to and communicate with other devices and/or a network.

Figure 3:
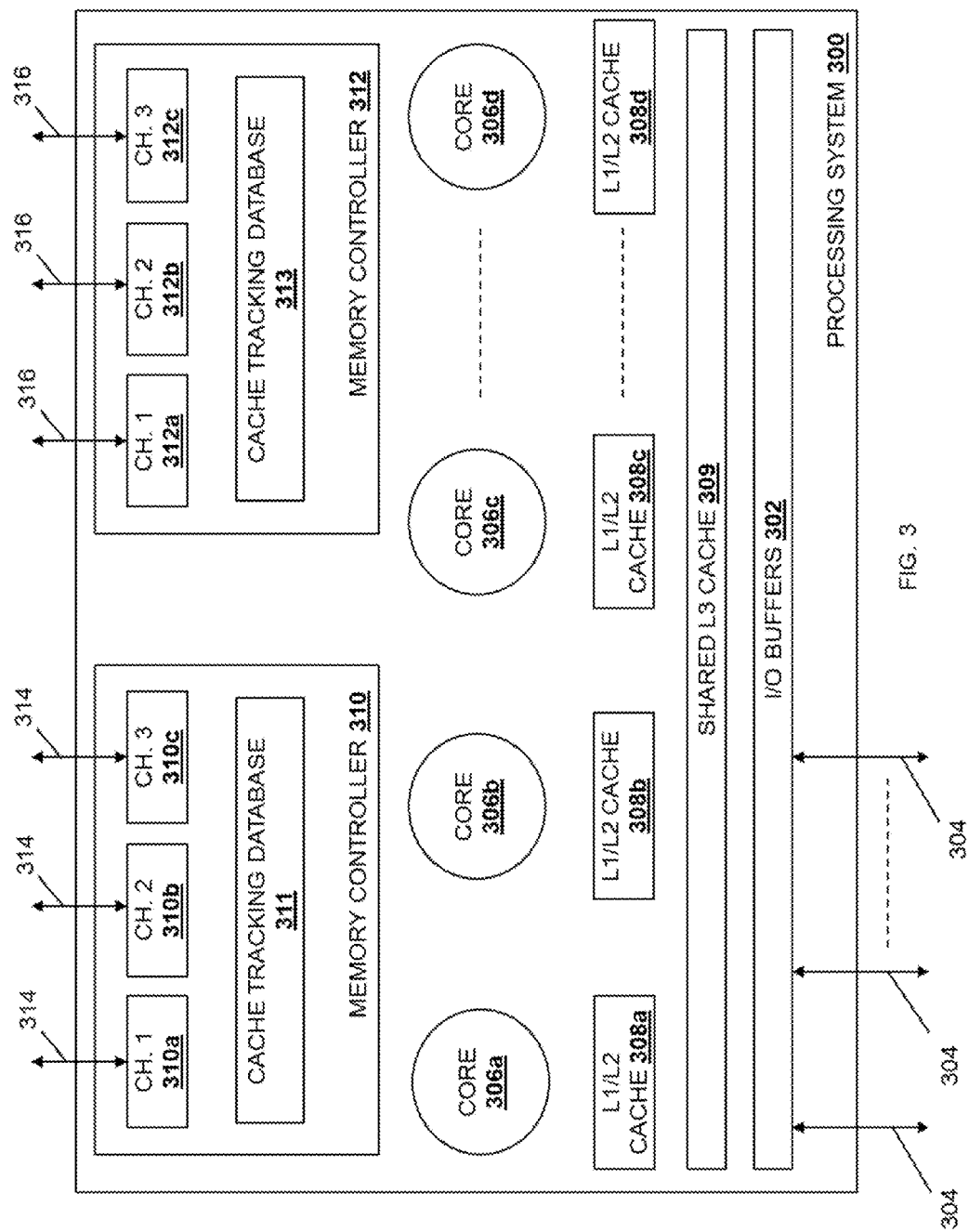
FIG. 3 is a schematic view illustrating an embodiment of a processing system used in the computing device of FIG. 2.

Referring now to FIG. 3, an embodiment of a processing system 300 is illustrated that may provide at least a portion of the processing system 204 discussed above with reference to FIG. 2. For example, the processing system 300 may be provided by one or more Central Processing Units (CPUs) that are included in the processing system 204, although other processing system configurations are envisioned as falling within the scope of the present disclosure. In the illustrated embodiment, the processing system 300 includes a plurality of Input/Output (I/O) buffers 302 that are coupled via links 304 to computing device subsystems such as, for example, the computing device components 208 and the communication system 210 discussed above with reference to FIG. 2. For example, the links 304 may be provided by Peripheral Component Interconnect express (PCIe) couplings, Direct Media Interface (DMI) couplings, Universal Peripheral Interface (UPI) couplings, and/or other processing system couplings known in the art.

In the illustrated embodiment, the processing system 300 also includes a plurality of processor cores 306a, 306b, 306c, and up to 306d that may be provided by one or more of the CPUs discussed above. The processing system 300 also includes a processing system cache that, in the illustrated embodiment, is provided by "private" level 1 and/or level 2 caches 308a, 308, 308c, and up to 308d that are each provided for a respective one of the processor cores 306a-306d, and a shared level 3 cache 309 that is shared by each of the processor cores 306a-306d, although other processor core/processing system cache configurations are envisioned as falling within the scope of the present disclosure. The processing system 300 also includes a plurality of memory controllers 310 and 312 that are coupled to the processor cores 306a-306d. In the illustrated embodiment, the memory controllers 310 and 312 are integrated memory controllers that are provided as part of the processing system 300 (e.g., the CPUs), although memory controllers that are coupled to the processing system (e.g., the CPUs) are envisions as falling within the scope of the present disclosure as well. Furthermore, while only two memory controllers are illustrated, other numbers of memory controllers may be provided in and/or with the processing system 300 while remaining within the scope of the present disclosure.

The memory controller 310 includes a plurality of communications channels 310a, 310b, and 310c that are each configured to couple to the memory system 206 discussed above with reference to FIG. 2 via respective links 314. In the embodiments discussed below, the communication channels are described as fourth generation Double Data Rate (DDR4) channels, although previous and/or future generations of DDR may benefit from the teachings of the present disclosure and thus fall within its scope. As discussed in further detail below, the memory controller 310 includes a storage (not illustrated) that is configured to store and update a cache tracking database 311 (also known as a "cache scoreboard"). One of skill in the art in possession of the present disclosure will recognize that the memory controller 310 may include other components for providing the memory controller functionality discussed below that have not been illustrated for clarity. The memory controller 312 is substantially similar to the memory controller 310, and thus includes a plurality of communications channels 312a, 312b, and 312c that are each configured to couple to the memory system 206 discussed above with reference to FIG. 2 via respective links 316, and is configured to store and update a cache tracking database 313. In some of the embodiments discussed below, the functionality of the memory controllers 310 and 312 is described with regard to the memory controller 310, and one of skill in the art in possession of the present disclosure will recognize that the memory controller 312 may perform substantially similar functions as described below for the memory controller 310.

Figure 4:
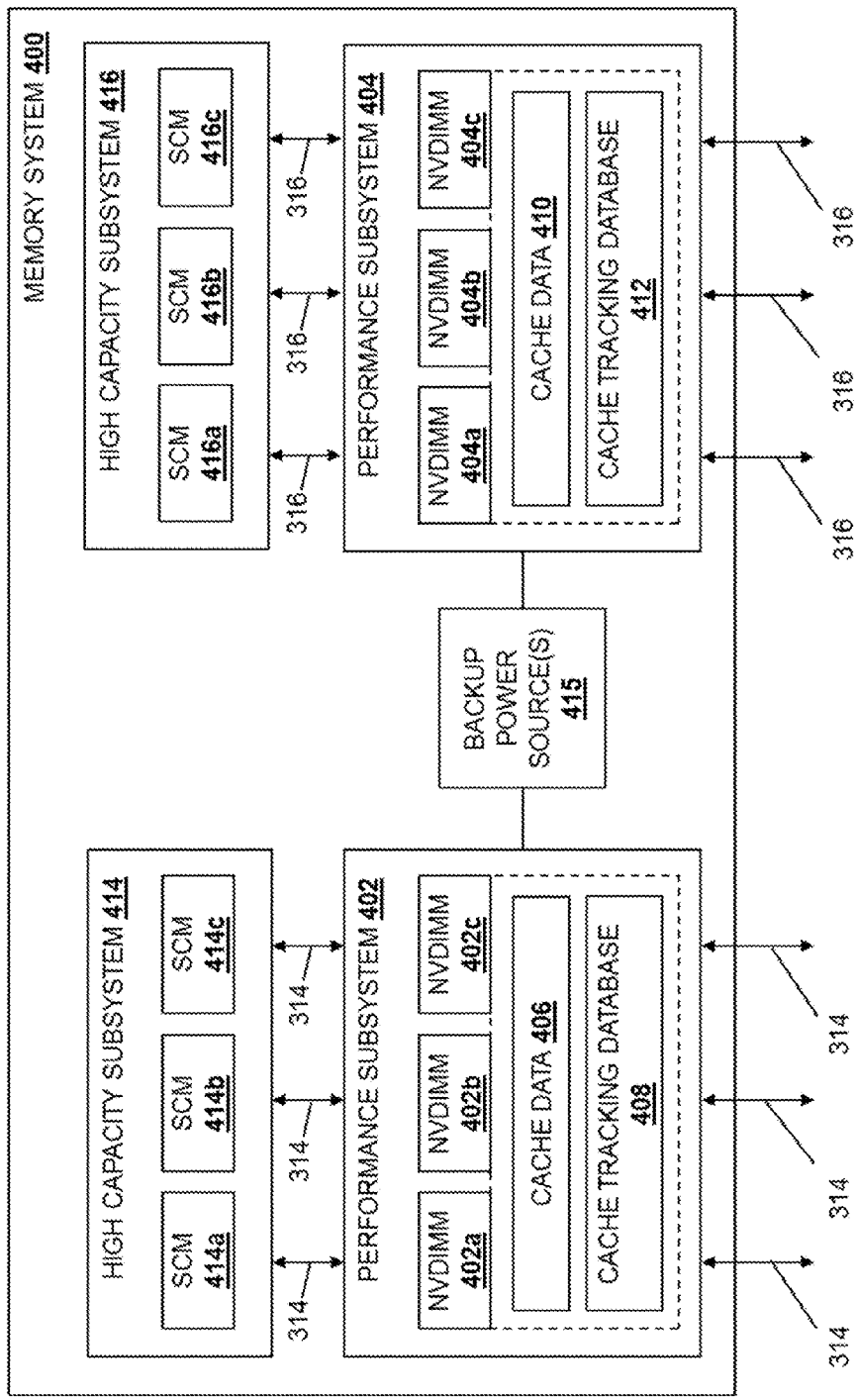
FIG. 4 is a schematic view illustrating an embodiment of a memory system used in the computing device of FIG. 2

Referring now to FIG. 4, an embodiment of a memory system 400 is illustrated that may be the memory system 206 discussed above with reference to FIG. 2. In the Illustrated embodiment, the memory system 400 includes a "performance" tier that is provided by a plurality of performance memory subsystems 402 and 404. While only two performance memory subsystems are illustrated in FIG. 4, different numbers of performance memory subsystems may be provided in the memory system 400 while remaining within the scope of the present disclosure. The performance memory subsystem 402 includes a plurality of non-volatile memory devices that are provided by "persistent" memory devices such as the Non-Volatile Dual Inline Memory Modules (NVDIMM-N-Ns) 402a, 402b, and 402c in FIG. 4, although other persistent non-volatile memory devices providing similar functionality to the NVDIMM-Ns discussed below will fall within the scope of the present disclosure. While only three NVDIMM-Ns are illustrated in the performance memory subsystem 402 in FIG. 4, different numbers of NVDIMM-Ns may be provided in the performance memory subsystem 402 while remaining within the scope of the present disclosure. As discussed below, the NVDIMM-Ns 402a-402c are configured to store cache data 406 and a cache tracking database 408 (as indicated by the dashed line) during at least some portions of the methods discussed below. However, FIG. 4 should not be interpreted as requiring the cache data 406 and the cache tracking database 408 to be stored on the performance memory subsystem 402 at all times (e.g., prior to booting up). In the illustrated embodiment, the performance memory subsystem 402 is coupled to the links 314 to the communications channels 310a, 310b, and 310c in the memory controller 310.

The performance memory subsystem 404 is substantially similar to the performance memory subsystem 406 and thus includes a plurality of NVDIMM-Ns 404a, 404b, and 404c that are configured to store cache data 410 and a cache tracking database 412 (as indicated by the dashed line) during at least some portions of the methods discussed below. In the illustrated embodiment, the performance memory subsystem 404 is coupled to the links 316 to the communications channels 312a, 312b, and 312c in the memory controller 312. In some of the embodiments discussed below, the functionality of the performance memory subsystems 402 and 404 is described with regard to the performance memory subsystem 402, and one of skill in the art in possession of the present disclosure will recognize that the performance memory subsystem 404 may perform substantially similar functions as described below for the performance memory subsystem 402. Each of the performance memory subsystems 402 and 404 are coupled to one or more alternate or backup power sources 415 or other energy stores that may include one or more of a battery, a super capacitor, and/or other memory system power sources known in the art. As discussed below, the cache data 406 and 410 stored on the performance memory system 402 and 404 may be protected via the use of encryption keys that may be used by the NVDIMM-Ns to control access to the cache data 406 and 410.

In the Illustrated embodiment, the memory system 400 also includes a "high capacity" tier that is provided by a plurality of high capacity memory subsystems 414 and 416.

While only two high capacity memory subsystems are illustrated in FIG. 4, different numbers of high capacity memory subsystems may be provided in the memory system 400 while remaining within the scope of the present disclosure. The high capacity memory subsystem 414 includes a plurality of non-volatile memory devices that are provided by the Storage Class Memory (SCM) devices 414a, 414b, and 414c in FIG. 4, which as discussed above utilize new type of non-volatile memory technology (e.g., SCM initially marketed under the brand names "3DXPOINT" and "OPTANE" developed by INTEL® Corporation of Redmond, Wash., United States, and MICRON® Technology Incorporated of Boise, Id., United States) and that provide for much higher storage capacities and write durability than physical-comparable conventional non-volatile memory, but which suffer from performance limitations such as lower latency and bandwidth as compared to that conventional non-volatile memory. For example, the SCM devices in the memory system 400 may have up to 10× slower latency and 4× slower bandwidth than the NVDIMM-Ns in the memory system. While only three SCM devices 414a-414c are illustrated in the high capacity memory subsystem 414 in FIG. 4, different numbers of SCM devices may be provided in the high capacity memory subsystem 414 while remaining within the scope of the present disclosure. In the illustrated embodiment, the high capacity memory subsystem 414 is coupled to the links 314 to the communications channels 310a, 310b, and 310c in the memory controller 310. For example, the links 314 and 316 may be provided by Joint Electron Device Engineering Council (JEDEC) Dual Data Rate 4 (DDR4) memory interfaces, and the memory controllers 310 and 312 may be configured to communicate with the performance subsystems 402 and 404, respectively, using the DDR4 protocol. However, due to the lower performance of the high capacity subsystems 414 and 416, the memory controllers 310 and 312 may be configured to communicate with the high capacity subsystems 414 and 416, respectively, using proprietary protocols (e.g., the DDR4-T protocol developed by INTEL® Corporation of Redmond, Wash., United States for such communication with 3DXPOINT SCM devices) that run on top of the standard DDR4 electrical connections and in conjunction with the standard DDR4 protocol.

In the embodiments illustrated and described herein, the high capacity systems 414 and 416 are provided using SCM devices that are distinguished from the "persistent" memory devices provided in the NVDIMM-N memory devices of the performance subsystems 402 and 404. However, other memory devices may be utilized in the performance memory subsystems 402 and 404 while remaining within the scope of the present disclosure. For example, the performance memory subsystems 402 and 404 may be provided using Magneto-resistive Random Access Memory (MRAM) devices, memristor devices, or even other SCM devices (e.g., relatively high speed SCM devices may be provided in performance subsystems 402 and 404 alongside high capacity subsystems 414 and 416 that use slower, higher capacity SCM devices). As such, the NVDIMM-N memory devices discussed below are provided as one specific example of memory devices appropriate for the performance memory subsystems 402 and 404.

The high capacity memory subsystem 416 is substantially similar to the high capacity memory subsystem 414 and thus includes a plurality of SCM devices 416a, 416b, and 416c, and is coupled to the links 316 to the communications channels 312a, 312b, and 312c in the memory controller 312. In the embodiments discussed below, the functionality of the high capacity memory subsystems 414 and 416 is described with regard to the high capacity memory subsystem 414, and one of skill in the art in possession of the present disclosure will recognize that the high capacity memory subsystem 416 may perform substantially similar functions as described below for the high capacity memory subsystem 414.

Figure 5:
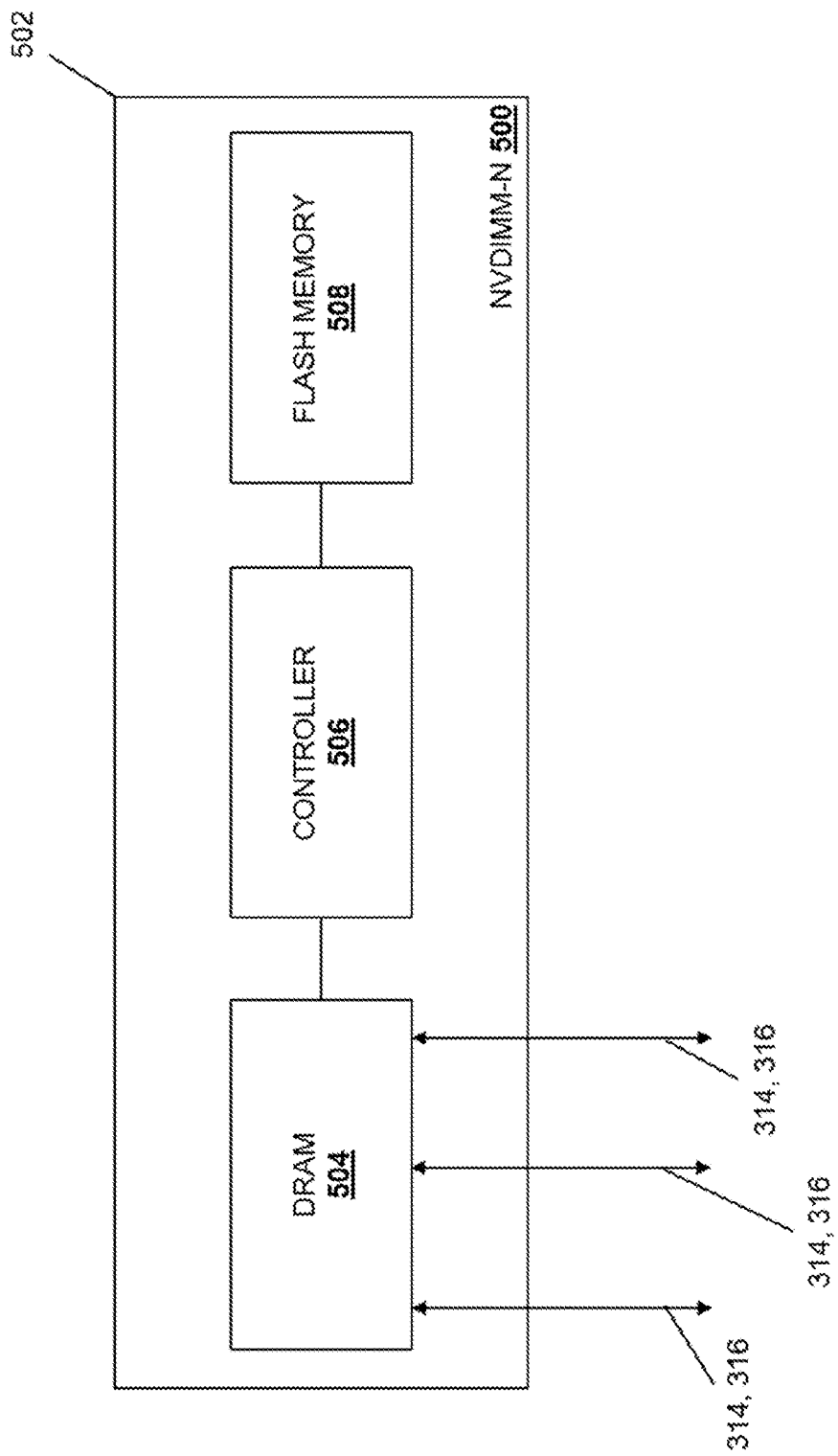
FIG. 5 is a schematic view illustrating an embodiment of a NVDIMM-N used in the memory system of FIG. 4.

Referring now to FIG. 5, an embodiment of an NVDIMM-N 500 is illustrated that may be any of the NVDIMM-Ns 402a-402c and 404a-404c discussed above with reference to FIG. 4. The NVDIMM-N 500 includes a base 502 that may be a circuit board and/or other DIMM base material known in the art. In the illustrated embodiment, a volatile memory is included on the base 502 and provided by a Dynamic Random Access Memory (DRAM) 504 that may include any number of DRAM devices. A controller 506 is coupled to the DRAM 504 and to a non-volatile memory that is provided by a flash memory 508 that may include any number of flash memory devices. In an embodiment, the capacity of the flash memory 508 may be approximately equal to the capacity of the DRAM 504, although embodiments where the flash memory capacity is greater than the DRAM capacity may fall within the scope of the present disclosure as well. While not illustrated, the NVDIMM-N 500 may include a variety of other components such as, for example, a connector that is coupled to the DRAM 504 and configured to couple the DRAM 504 to the memory controllers 310/312 (e.g., via the links 314/316 as illustrated) when the NVDIMM-N 500 is provided in the memory system 206/400 (e.g., by coupling the NVDIMM-N 500 to a memory slot on the computing device 200), as well as any other NVDIMM-N components known in the art.

With reference to the embodiments illustrated in FIGS. 2, 3, 4, and 5 above, a specific example of a memory system with an SCM memory mode DRAM-NVDIMM-N cache system that provides for persistent data storage for the memory system is now described. The high capacity memory subsystems 414 and 416 may provide up to 3 terabytes (TBs) of main memory per each CPU socket that is visible to the operating system of the computing device 200, while the performance memory subsystems 402 and 404 may each provide a DIMM cache that is managed by their associated memory controllers 310 and 312, respectively, and that provides a "look-aside" cache in that those DIMM caches are only visible to their memory controllers 310 and 312 (and not to the operating system in the computing device 200). As such, the DIMM caches provided by the performance memory subsystems 402 and 404 do not need to be part of the CPU cache coherency protocol. Rather, each memory controller 310 and 312 may control a physical address range of the system address map and may track the state of data within its respective performance memory subsystem and high-capacity memory subsystem available on its DDR channels using its respective cache tracking database 311 and 312d (i.e., the DIMM caching provided by the performance memory subsystems 402 and 404 is within the domains of their respective memory controllers 310 and 312). As illustrated, each of the memory controllers 310 and 312 controls 3 DDR4 channels, and in some embodiments may control up to 2 DIMMs per channel. As discussed below, portions of the storage capacity of the DRAM-NVDIMM-Ns in the performance memory subsystems 402 and 404 may be reserved for save/restore functions associated with their respective memory controller cache tracking databases, while the remaining majority of the storage capacity of those DRAM-NVDIMM-Ns acts as the DIMM data cache to store cache data.

Figure 6:
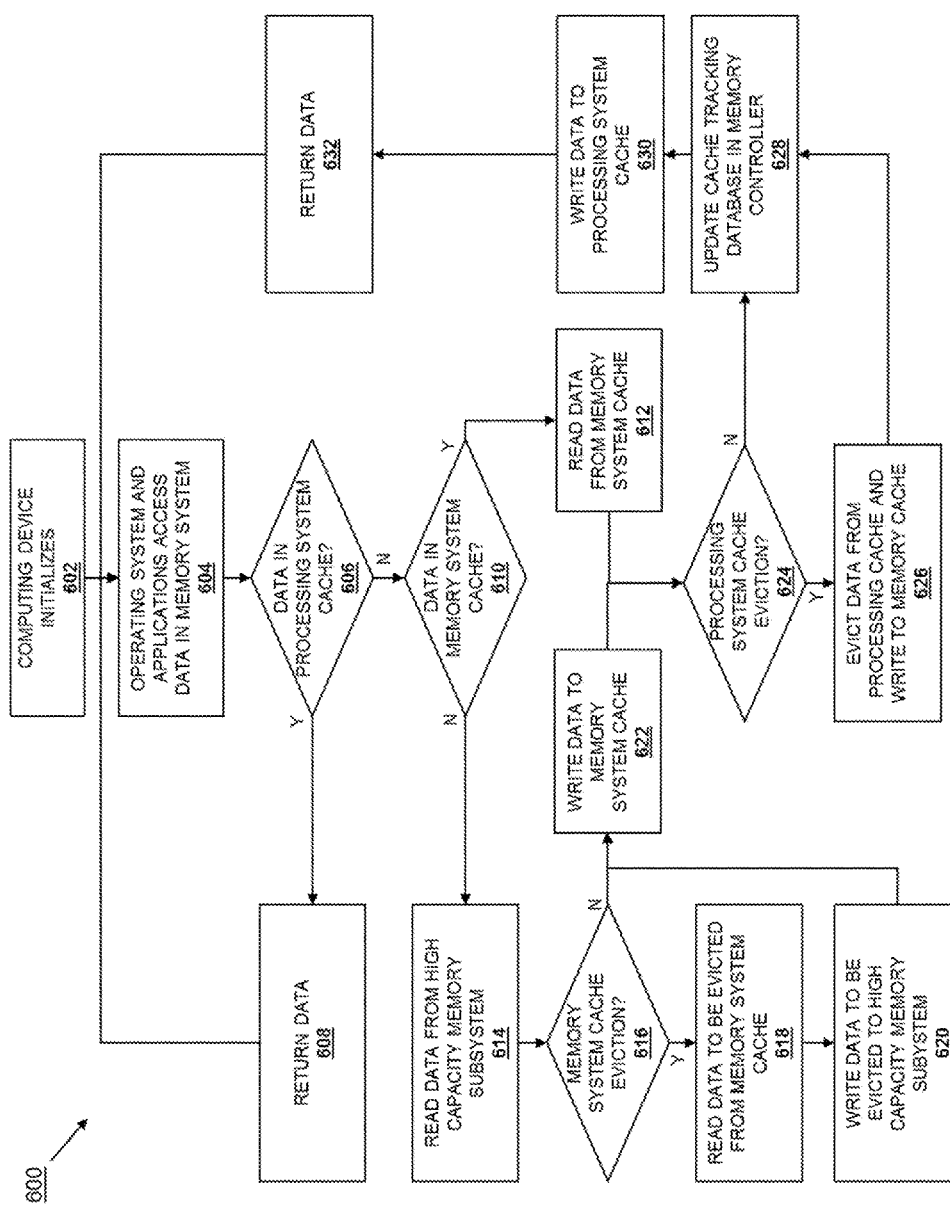
FIG. 6 is a flow diagram illustrating an embodiment of a method for providing an SCM memory mode NVDIM cache system during runtime operation of the computing device of FIG. 2.
Figure 7:
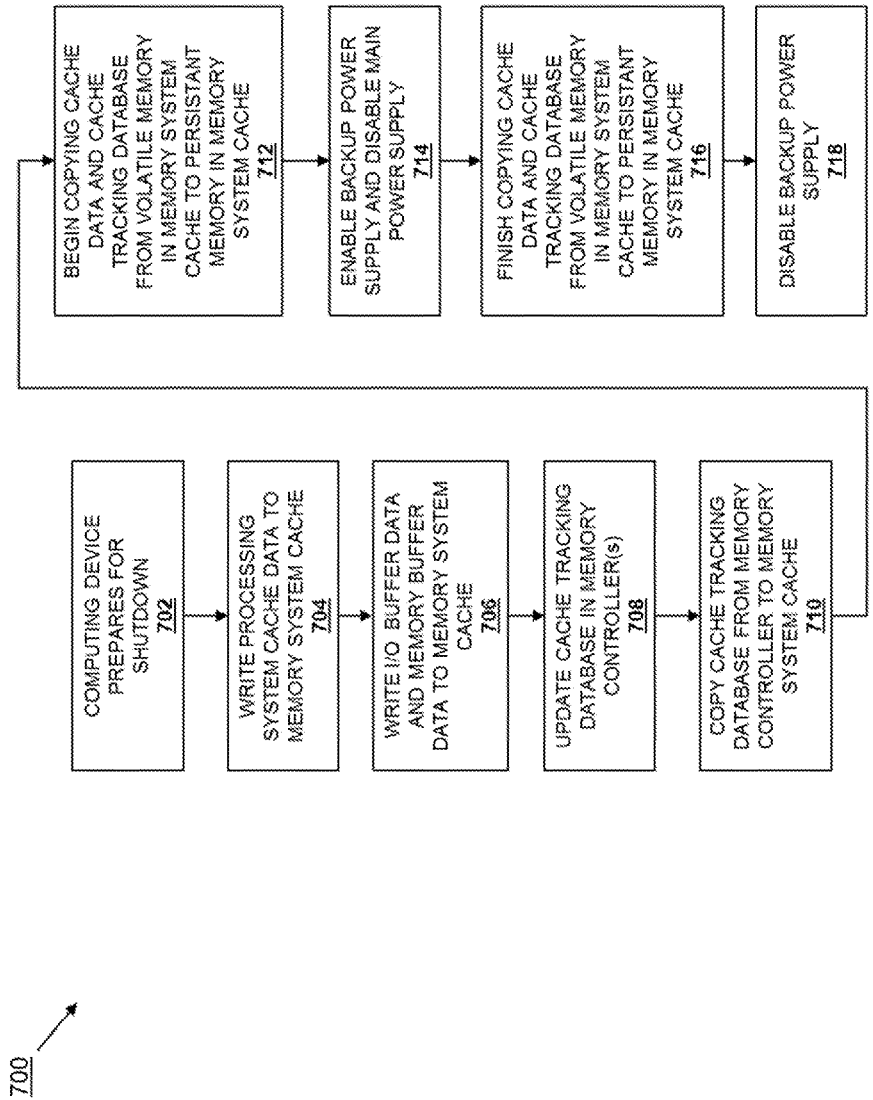
FIG. 7 is a flow diagram illustrating an embodiment of a method for providing an SCM memory mode NVDIM cache system during a power shutdown of the computing device of FIG. 2
Figure 8:
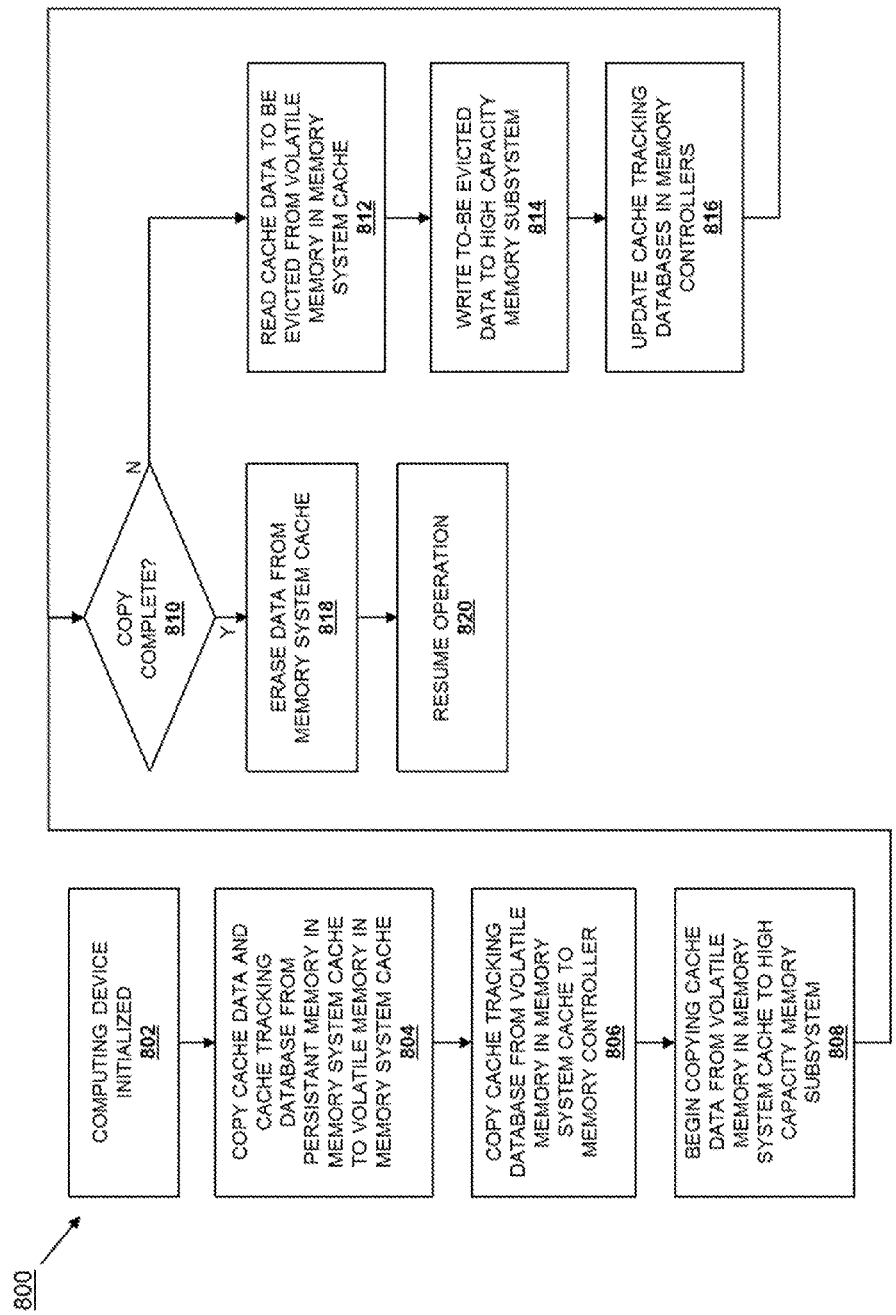
FIG. 8 is a flow diagram illustrating an embodiment of a method for providing an SCM memory mode NVDIM cache system during restore of the computing device of FIG. 2 following a power shutdown.

Referring now to FIGS. 6, 7, and 8, embodiments of methods that describe the operation of an SCM memory mode cache system are provided. Specifically, the method 600 describes the operation of an SCM memory mode NVDIMM-N cache system during runtime of a computing device, the method 700 describes the operation of the SCM memory mode NVDIMM-N cache system in response to a shutdown (e.g., a power failure) in the computing device, and the method 800 describes the operation of the SCM memory mode NVDIMM-N cache system upon the restore of the computing device following the shutdown described in the method 700. As discussed below, the SCM memory mode NVDIMM-N cache system replaces volatile RDIMM/LRDIMMs, which are conventionally used in memory systems with SCM devices operating in a memory mode, with NVDIMM-Ns, and performs operations in response to a shutdown that, upon restore of the computing device following a shutdown, allow the memory system to operate as a persistent memory system such that the data written to the memory system prior to the shutdown is available in the same state once the system is restored. As such, data that would be lost in conventional SCM memory mode memory systems due to that data having been written to the RDIMMs/LRDIMMs but not yet copied to the SCM devices at shutdown is available upon system restore due to the operation of the SCM memory mode NVDIMM-N cache system of the present disclosure.

Referring first to FIG. 6, the method 600 begins at block 602 where a computing device is initialized. In an embodiment, at block 602 the computing device 200 is powered up, reset, and/or otherwise initialized. For example, the BIOS in the processing system 204 may initialize the SCM devices 414a-414c and 416a-416c in the high capacity memory subsystems 414 and 416, respectively, for memory mode operation (discussed above). The BIOS in the processing system 204 may then initialize the NVDIMM-Ns 402a-402c and 404a-404c in the performance memory subsystems 402 and 404, respectively, for DIMM cache operation (discussed above). The BIOS (or a Baseboard Management Controller (BMC)) in the processing system 204 may then validate system power sources support hold-up and NVDIMM-N SAVE power requirements. The operating system and applications provided on the computing device 200 may then be launched. While a specific initialization process has been described as occurring in the computing device 200 at block 602, one of skill in the art in possession of the present disclosure will recognize that other actions may be performed at block 602 while remaining within the scope of the present disclosure. The method 600 then proceeds to block 604 where the operating system and applications access data in the memory system. In an embodiment, at block 604 the operating system and/or any of the applications provided on the computing device 200 may access data that is stored on the memory system 206/400.

The method 600 then proceeds to decisions block 606 where it is determined whether the data being accessed is located in the processing system cache. In an embodiment, at block 604 the data access request may be received by the processing system 204, and at block 606 the processing system 204 may determine whether the data being accessed is located in the level 1 and/or level 2 caches 308a-308d and/or the level 3 cache 309. For example, the processor core 306a may determine whether the data being accessed is located in the private level 1 and/or level 2 cache 308a and/or the shared level 3 cache 309. If, at decision block 606, it is determined that the data being accessed is located in the processing system cache, the method 600 proceeds to block 608 where the data is returned. In an embodiment, if the processing system 204 determines that the data being accessed is located in the processing system cache, at block 608 that data may be provided from the processing system cache to a processor core. Continuing the example discussed above, if the data being accessed in located in the private level 1 and/or level 2 cache 308a and/or the shared level 3 cache 309, at block 608 that data may be returned to the processor core 306a using read operations that return data to the processor core 306a and/or write operations that return data that is then merged with write data from the processor core 306a. The method 600 then returns to block 604 where the operating system and applications in the computing device 200 access data in the memory system 206.

If, at decision block 606, it is determined that the data being accessed is not located in the processing system cache, the method 600 then proceeds to block 610 where it is determined whether the data being accessed is located in the memory system cache. In an embodiment, at decision block 610 the processing system 204 may determine whether the data being accessed is located in the one of the performance memory subsystems 402 or 404. For example, the memory controller 310 may receive the data access request and, in response, reference the cache tracking database 311 to determine whether the data being accessed is located in the performance memory subsystem 402 or the high capacity memory subsystem 414. Similarly, the memory controller 312 may receive the data access request and, in response, reference the cache tracking database 313 to determine whether the data being accessed is located in the performance memory subsystem 404 or the high capacity memory subsystem 416.

As discussed above, the cache tracking databases 408 and 412 are created and updated by their respective memory controllers 402 and 404 to track the location and status of data stored in their respective performance memory subsystem and high capacity memory subsystem, and one of skill in the art in possession of the present disclosure will recognize how those cache tracking databases 408 and 412 may be used by the memory controllers 310 and 312 to determine the location of data in their respective domains. If at decision block 610 it is determined that the data being accessed is located in the memory system cache, the method 600 proceeds to block 612 where data is read from the memory system cache. In an embodiment, if the memory controller 310 determines at decision block 610 (e.g., via its cache tracking database 311) that the data being accessed is located in the performance memory subsystem 402, at block 612 the memory controller 310 may use the information in the cache tracking database 311 to read that data from the appropriate NVDIMM-N(s) 402a-402c via the link(s) 314 accessible through the communication channel(s) 310a-310c. For example, at block 612, the memory controller 310 may operate to read data from the DRAM 504 in the NVDIMM-N(s) 402a-402c/500 (e.g., data that may have been previously read in to the NVDIMM-N(s) from the SCM devices at block 614, discussed below, or data that may have been previously updated by a processing cache eviction at block 626, discussed below). As discussed below, encryption keys may be used to protect data in the memory system cache, and thus block 612 may involve the memory controller 310 retrieving and/or providing an encryption key for use in accessing the data from the memory system cache. If at decision block 610 it is determined that the data being accessed is not located in the memory system cache, the method 600 proceeds to block 614 where data is read from a high capacity memory subsystem. In an embodiment, if the memory controller 310 determines at decision block 610 (e.g., via its cache tracking database 311) that the data being accessed is not located in the performance memory subsystem 402, at block 614 the memory controller 310 may use the information in the cache tracking database 311 to read that data from the appropriate SCM device(s) 414a-414c via the link(s) 314 accessible through the communication channel(s) 310a-310c.

The method 600 then proceeds to decision block 616 where it is determined whether a memory system cache eviction is to be performed. In an embodiment, at decision block 616 the memory controller 310 may determine whether data located in the performance memory subsystem 402 should be evicted (e.g., when space in memory needs to be made available for new cache data). If, at decision block 616, it is determined that data should be evicted from the memory system cache, the method 600 then proceeds to block 618 where the data to-be-evicted is read from the memory system cache. In an embodiment, if the memory controller 310 determines at decision block 616 that the data is to be evicted from the performance memory subsystem 402, at block 618 the memory controller 310 may use the information in the cache tracking database 311 to read that data from the appropriate NVDIMM-N(s) 402a-402c via the link(s) 314 accessible through the communication channel(s) 310a-310c. For example, at block 618, the memory controller 310 may operate to read data from the DRAM 504 in the NVDIMM-N(s) 402a-402c/500. As discussed below, encryption keys may be used to protect data in the memory system cache, and thus block 618 may involve the memory controller 310 retrieving and/or providing an encryption key for use in accessing the data from the memory system cache. The method 600 then proceeds to block 620 where the data to-be-evicted is written to the high capacity memory subsystem. In an embodiment, at block 620 the memory controller 310 writes the data that is to-be-evicted from the performance memory subsystem 402 (i.e., the NVDIMM-N(s) 402a-402c) to the high capacity memory subsystem 414 (i.e., the SCM device(s) 414a-414c). If it is determined at decision block 616 that data does not need to be evicted from the memory system cache, or following block 620, the method 600 proceeds to block 622 where data is written to the memory system cache. In an embodiment, at block 622 the memory controller 310 may write data to the performance memory subsystem 402 (e.g., the NVDIMM-N(s) 402a-402c). For example, at block 622, the memory controller 310 may operate to write data to the DRAM 504 in the NVDIMM-N(s) 402a-402c/500. As discussed below, encryption keys may be used to protect data in the memory system cache, and thus block 622 may involve the memory controller 310 retrieving and/or providing an encryption key for use in accessing the data from the memory system cache. One of skill in the art in possession of the present disclosure will recognize that in some embodiments, the method 600 up to block 622 does not require reads from the memory system cache/NVDIMM-N(s) because the memory controller(s) 310/312 have already read the most up-to-date data from the SCM devices in the high capacity memory subsystem(s) 414/416, and the memory controllers 310/312 may rather update their read cache in the NVDIMM-N(s) with data from the SCM device(s).

Following the reading of data from the memory system cache at block 612, or the writing of the data to the memory system cache at block 622, the method 600 then proceeds to decision block 624 where it is determined whether a processing system cache eviction is to be performed. While block 624 is illustrated and described as occurring following block 622, those blocks may be performed in the method 600 in a different order and/or at the same time while remaining within the scope of the present disclosure. In an embodiment, at decision block 624 the processing system 204 may determine whether data located in the processing system cache should be evicted. The memory system cache provided by the NVDIMM-N(s) may be smaller in capacity than the SCM devices, and the processing cache may be smaller than either of the memory system cache and processing system cache (e.g., the "closer" to the processor core, the smaller (and faster) the cache becomes). When a read "misses" in a cache that is closer to the processor core, the cache controller reads in data from a larger cache that is further away from the processor core. In the worst case scenarios, all of the caches may "miss", and the data may then be read in from the volatile memory or SCM devices. In typical cache structures, the new memory address may be brought into the cache it was previously read into, and because the cache is limited in size, the data associated with the new memory address takes the place of data for an existing memory address. If the cache is empty or has space available, then no replacement may occur. However, under normal operation (e.g., once the processors have been executing for some time period) the cache will fill up and replacements will occur. If that replaced data is modified (i.e., it is the most up-to-date version of the data), then it must be evicted from the cache and written back (normally to the next cache/memory that is further away). In many embodiments, cache systems are write-back, meaning all cache replacements of modified data will generate a write. In an embodiment, the eviction at block 624 provides for the replacement of modified data, and for non-modified data, the existing data may be over-written by the new cache line with no data loss (as the main memory or SCM devices have a copy of the most up-to-date data). Thus, in many embodiments, the evictions described herein may only generate writes for modified data that is evicted.

In one example, at decision block 624 the cache controller may determine whether data in the level 1 and/or level 2 cache 308a and/or the shared level 3 cache should be evicted. If, at decision block 624, it is determined that data should be evicted from the processing system cache, the method 600 then proceeds to block 626 where data is evicted from the processing system cache and written to the memory system cache. In an embodiment, if it is determined at decision block 624 that the data is to be evicted from the processing system cache, at block 626 the cache controller evicts the cache-line associated with that data, and the memory controller 310 writes that data to the NVDIMM-N(s) 402a-402c via the link(s) 314 accessible through the communication channel(s) 310a-310c. For example, at block 626 the cache controller may evict a cache-line associated with the data that is being evicted in the level 1 and/or level 2 cache 308a and/or the shared level 3 cache, and the memory controller 310 may write that data to the DRAM 504 in the NVDIMM-N(s) 402a-402c/500.

If, at decision block 624, it is determined that data does not need to be evicted from the processing system cache, or following block 626, the method 600 then proceeds to block 628 where the cache tracking database in the memory controller is updated. In an embodiment, at block 628 the memory controller 310 may modify the cache tracking database 311 with the details of any of the data operations that were performed in the performance memory subsystem 402 and/or the high capacity memory subsystem 414 discussed above in order to update the cache tracking database 311 (e.g., the cache "scoreboard") so that it details the locations and statuses of the data in the performance memory subsystem 402 and the high capacity memory subsystem 414. In an embodiment, the cache tracking databases 310d and 312d may provide for memory system state-machine tracking of the memory system cache. For example, each cache tracking database 311 and 312d may include entries that track request tags, victim tags, and entry status, and when a read request tag matches a data return tag, the memory controller may determine that the return data is a memory cache "hit" and return that that to the requester. Furthermore, for reads with a mismatched tag in the data return, the memory controller may evict the entry from the cache tracking database and issue a high capacity memory subsystem (e.g., SCM device) read to fill the memory system cache. Further still, if the evicted memory system cache entry is modified/dirty (e.g., that entry provides an updated "version" of data that is inconsistent with the corresponding earlier "version" of that data that was provided in the high capacity memory subsystems (e.g., SCM device)), the memory controller may issue an eviction write to the high capacity memory subsystem (or a "silent" eviction may be performed and the memory system cache location may be overwritten with the high capacity memory subsystem fill data return). One of skill in the art in possession of the present disclosure will recognize that the discussion above may hold true for other cache tiers as well, with the NVDIMM-N(s) providing a cache tier outside of the processing system and thus maintaining a separate cache scoreboard (and a memory controller managing the NVDIMM-N cache while a separate cache controller managing the internal processing caches). While a few specific examples of actions performed with regard to cache tracking databases have been described, one of skill in the art in possession of the present disclosure will recognize that other actions may be performed that will fall within the scope of the present disclosure.

The method 600 then proceeds to block 630 where data is written to the processing system cache. In an embodiment, at block 630, the memory controller 310 may write the data that was retrieved from the memory system cache at block 612, or from the high capacity memory subsystem 414 at block 614, to the processing system cache. For example, at block 630 the memory controller 310 may write the data that was retrieved to the level 1 and/or level 2 cache 308a and/or the shared level 3 cache 309 that is accessible to the processor core 306a. The method 600 then proceeds to block 632 where the data is returned. In an embodiment, following the writing of data to the processing system cache at block 630, at block 632 that data may be provided from the processing system cache to a processor core. For example, if the data was written to the private level 1 and/or level 2 cache 308a and/or the shared level 3 cache 309, at block 608 that data may be returned to the processor core 306a using read operations that return data to the processor core 306a and/or write operations that return data that is then merged with write data from the processor core 306a. The method 600 then returns to block 604 where the operating system and applications in the computing device 200 access data in the memory system 206. As such, during operation of the computing device 200, the method 600 allows data to be written to and read from the memory system 206/400 quickly, at least in part, by writing data to the NVDIMM-Ns in the performance memory subsystem(s), while providing for the copying that data over to the high capacity memory subsystem(s) and eviction of that data from the performance memory subsystem(s), as well as provided data in the processing system cache for quick access, all while updating the location and status of the data in the memory system via the cache tracking database(s).

Referring now to FIG. 7, the method 700 begins at block 702 where a computing device prepares for a planned or unplanned shutdown. In an embodiment, at block 702 the computing device 200 may prepare for a shutdown in response to an unplanned loss of power, a determination that power loss is imminent and/or other shutdown situations known in the art. While the discussions below detail shutdown in the event of an unplanned loss of power, one of skill in the art in possession of the present disclosure will recognize that planned shutdowns may involve copying of the cache data directly to the SCM devices, rather than copying that cache data to the NVDIMM-N flash memory first as discussed below. While such shutdown operations may increase shutdown times, they may also operate to minimize the number of NVDIMM-N SAVE operations and thus improve reliability due to the reduction of writes to the NVDIMM-N flash memory. In an example of block 702 a Power Supply Unit (PSU) may provide a system interrupt signal or other indication of input power loss and, in response, an Asynchronous Data Refresh (ADR) process may be initiated. One of skill in the art in possession of the present disclosure will recognize that the teachings of the present disclosure provide enhancements conventional CPU/chipset ADR processes that are performed during power failures to flush write buffers and the CPU cache to memory. In an embodiment, the BIOS in the processing system 204 may then enter System Management Mode (SMM) and disable throttling.

The method 700 then proceeds to block 704 where the processing system cache is written to the memory system cache. In an embodiment, at block 704 the processing system 204 may flush the processing system cache, and the memory controllers 310 and 312 may write the flushed data to the memory system cache. For example, at block 704, the BIOS may flush the level 1 and level 2 caches 308a-308d and the shared cache 309, and the memory controllers 310 and 312 may write the flushed data to the NVDIMM-N(s) 402a-402c and 404a-404c in their respective performance memory subsystems 402 and 404. As discussed below, encryption keys may be used to protect data in the memory system cache, and thus block 704 may involve the memory controller 310 retrieving and/or providing an encryption key for use in accessing the data from the memory system cache. Following the writing of the flushed data from the processing system cache to the memory system cache, the BIOS in the processing system 204 may start an ADR timer and send an ADR request to Power Control Unit(s) (PCU(s)) in the CPU(s). The method 700 then proceeds to block 706 where the I/O buffer data and the memory buffer data are written to the memory system cache. In an embodiment, at block 706 the PCU(s) in the CPU(s) may flush the I/O buffers 302 and the memory buffers in the memory controllers 310 and 312, and the memory controllers 310 and 312 may write the flushed I/O buffer data and memory buffer data to the NVDIMM-Ns 402a-402c and 404a-404c in their respective performance memory subsystems 402 and 404. As such, following block 706, the final data writes to the memory system 206/400 (i.e., prior to shutdown of the computing device 200) are completed.

The method 700 then proceeds to block 708 where the cache tracking databases are updated in the memory controllers. In an embodiment, the memory controllers 310 and 312 update their cache tracking databases 310d and 312d, respectively. As such, at block 708 the cache tracking databases 310*d* and 312*d* are updated to include the locations and statuses of all the data in the memory system 206/400 prior to the shutdown. The method 700 then proceeds to block 710 where the cache tracking databases are copied from the memory controllers to the memory system cache. In an embodiment, at block 710 the memory controllers 310 and 312 copy their cache tracking databases 310*d* and 312*d*, respectively, to the NVDIMM-Ns 402*a*-402*c* and 404*a*-404*c*, respectively, in their respective performance memory subsystems 402 and 404. As such, in a specific example, the cache tracking databases 408 and 412 may be provided on the performance memory subsystems 402 and 404, respectively, as copies of the cache tracking databases 310*d* and 312*d* in the memory controller 310 and 312, respectively, in the state they were in immediately prior to shutdown. However, while the cache tracking databases 408 and 412 are described as first being provided in the NVDIMM-Ns 402*a*-402*c* and 404*a*-404*c* of the performance memory subsystems 402 and 404, respectively, at block 710 (e.g., in response to a shutdown/power failure), in some embodiments, some or all of the cache tracking databases 310*d* and 312*d* may be copied to provide the cache tracking databases 408 and 412 in the performance memory subsystems 402 and 404 during operation of the computing device 200 (e.g., during the method 600) while remaining within the scope of the present disclosure.

The method 700 then proceeds to block 712 where the process of copying the cache data and cache tracking database from volatile memory in the memory system cache to persistent memory in the memory system cache begins. In an embodiment, at block 712, the memory controllers 310 and 312 may operate to put the NVDIMM-Ns 402*a*-402*c* and 404*a*-404*c* in the performance memory subsystems 402 and 404, respectively, into a self-refresh mode, which may end the enhanced ADR process discussed above. At block 712, the ADR timer started at block 704 may end and trigger a system interrupt that causes programmable logic in the system (e.g., a complex programmable logic device (CPLD) to assert a save command (e.g., SAVE#) to the NVDIMM-Ns 402*a*-402*c* and 404*a*-404*c* in the performance memory subsystems 402 and 404. In an embodiment, in response to the save command, the NVDIMM-Ns 402*a*-402*c* in the performance memory subsystem 402 may begin copying the cache data 406 and the cache tracking data 408 from non-volatile memory to persistent memory, and the NVDIMM-Ns 404*a*-404*c* in the performance memory subsystem 404 may begin copying the cache data 410 and the cache tracking data 412 from non-volatile memory to persistent memory. For example, at block 712, the controller 506 in the NVDIMM-Ns 402*a*-402*c*/404*a*-404*c*/500 may decouple the DRAM 504 from the links 314/316 to the memory controllers 310/312 and begin copying cache data (e.g., 406 and 410) and cache tracking databases (e.g., 408 and 412) from the DRAM 504 to the flash memory 508.

The method 700 then proceeds to block 714 where the backup power supply is enabled and the main power supply is disabled. In an embodiment, at block 714, the programmable logic in the system may de-assert the save command (e.g., SAVE#) to the NVDIMM-Ns 402*a*-402*c* and 404*a*-404*c* in the performance memory subsystems 402 and 404, and the power supply unit may be powered down (e.g., when the alternative power sources discussed below are enabled and ready). For example, the computing device 200 may power down to the S5-like Advanced Configuration and Power Interface (ACPI) power state. One of skill in the art in possession of the present disclosure will recognize that, in the event of an unexpected power loss, the computing device 200 may not enter a "true" S5 ACPI power state, as the 12V main and 12V auxiliary rails will be down and not providing power to the components of the computing device. 200. In some embodiment, the computing device 200 may include an alternative power source to power a baseboard management controller (BMC) such as a DELL® Remote Access Controller (iDRAC) available from DELL® Inc. of Round Rock, Tex., United States, which may create an S5-like ACPI state, but the computing device 200 may actually be in a transitional G3 ACPI power state (i.e., completely powered off). The programmable logic in the system may also enable the backup power source(s) 415 (e.g., a battery, super-capacitor, etc.) such that the backup power source(s) supply power to the performance memory subsystems 402 and 404, and disable the PSU output. As would be understood by one of skill in the art in possession of the present disclosure, the powering down of the computing device 200 to the ACPI S5 state and enablement of the backup power source(s) 415 may be performed in response to a power failure such that the cache data and cache tracking database may be transferred to the DRAM in the performance memory subsystems and the copying of cache data and cache tracking database to the persistent memory in the performance memory subsystems may begin (using the backup power source(s) 415) prior to the complete loss of power to the computing device 200.

The method 700 then proceeds to block 716 where the process of copying the cache data and cache tracking database from volatile memory in the memory system cache to persistent memory in the memory system cache is finished. In an embodiment, at block 716, the NVDIMM-Ns 402*a*-402*c* in the performance memory subsystem 402 may finish copying the cache data 406 and the cache tracking data 408 from non-volatile memory to persistent memory, and the NVDIMM-Ns 404*a*-404*c* in the performance memory subsystem 404 may finish copying the cache data 410 and the cache tracking data 412 from non-volatile memory to persistent memory. For example, at block 712, the controller 506 in the NVDIMM-Ns 402*a*-402*c*/404*a*-404*c*/500 may finish copying cache data (e.g., 406 and 410) and cache tracking databases (e.g., 408 and 412) from the DRAM 504 to the flash memory 508. In some embodiments, in response to a power failure associated with the computing device 200, block 716 is performed using only power from the backup power source(s) 415 (e.g., battery or super-capacitor power).

The method 700 then proceeds to block 718 where the backup power supply is disabled. In an embodiment, the programmable logic in the system may then disable the backup power source(s) 415 (e.g., a battery, super-capacitor, etc.) such that the backup power source(s) 415 no longer supply power to the performance memory subsystems 402 and 404. Thus, following the method 700, the computing device 200 is shutdown and cache data 406 and 410 that was stored in the performance memory subsystems 402 and 404, respectively, immediately prior to shutdown and which could not be copied to the high capacity memory subsystems 414 and 416 due to the shutdown, is stored in the persistent memory in the NVDIMM-Ns 402*a*-402*c* and 404*a*-404*c*. In addition, copies of the most recent versions of the cache tracking databases 310*d* and 312*d* in the memory controllers 310 and 312, respectively, that detail the locations and status of the data in the memory system 206/400 are stored as the cache tracking databases 408 and 412 in the persistent memory in the NVDIMM-Ns 402*a*-402*c* and 404*a*-404*c*.

Referring now to FIG. 8, the method 800 begins at block 802 where the computing device is restored. In an embodiment, at block 802 and following the shutdown described above in the method 700, the computing device 200 may be powered on, restarted, or otherwise initialized (e.g., after power is restored to the computing device 200 following a power failure). For example, the PSU power may be restored and the computing device 200 may enter the S5 ACPI state. It is noted that the S5 ACPI power state at block 802 is a "true" S5 ACPI power state, as opposed to the S5-like ACPI power state discussed above during the method 700. As such, the computing device 200 may transition from a G3 ACPI power state (i.e., mechanical off) until PSU input power is restored, which allows the computing device 200 to transition to the S5 ACPI power state. A power-on may then be requested for the computing device 200 (e.g., in response to an input to a power button, in response to a remote instruction received through a network, etc.), and the programmable logic in the system may enabled the PSU output. Following the enablement of the PSU output, the computing device 200 may then transition from the S5 ACPI state to the S0 ACPI state, and the processing system 204 may send a request to the performance memory subsystems 402 and 404 to restore. For example, the BIOS in the processing system 204 may send a restore request to the NVDIMM-Ns 402a-402 and 404a-404c in the performance memory subsystems 402 and 404, respectively.

The method 800 then proceeds to block 804 where cache data and cache tracking databases are copied from the persistent memory in the memory system cache to the volatile memory in the memory system cache. In an embodiment, the NVDIMM-Ns 402a-402c and 404a-404c in the performance subsystems 402 and 404, respectively, copy the cache data and cache tracking database that was stored in the persistent memory at blocks 712 and 716 to the volatile memory. For example, at block 804, the controller 506 in the NVDIMM-Ns 402a-402c/404a-404c/500 may copy the cache data and cache tracking database from the flash memory 508 to the DRAM 504. As discussed below, encryption keys may be used to protect data in the memory system cache, and thus block 804 may involve the memory controller 310 retrieving and/or providing an encryption key for use in accessing the data from the memory system cache. The method 800 then proceeds to block 806 where the cache tracking databases are copied from the volatile memory in the memory system cache to the memory controllers. In an embodiment, at block 806 the processing system 204 may send a request to the memory controllers 310 and 312 to restore their cache tracking databases and flush the memory system cache and, in response, the memory controllers 310 and 312 may copy the cache tracking databases from their performance subsystems 402 and 404, respectively. For example, the memory controller 310 may copy the cache tracking database 408 from the DRAM 504 in the NVDIMM-N(s) 402a-402c into its local memory to restore the cache tracking database 311 in its pre-shutdown form (e.g., detailing the locations and statuses of the data in the performance memory subsystem 402 and high capacity memory subsystem 414 immediately prior to the shutdown).

The method 800 then proceeds to block 808 where the process of coping cache data from the volatile memory in the memory system cache to the high capacity memory subsystem begins. In an embodiment, the memory controllers 310 and 312 begin copying the cache tracking databases from their performance subsystems 402 and 404, respectively. For example, at block 808 the memory controller 310 may begin reading the cache data 406 from the DRAM 504 in the NVDIMM-N(s) 402a-402c (e.g., the cache data 406 that includes the data that was written to the memory system 206/400 prior to shutdown but not copied over high capacity memory subsystem prior to shutdown), and writing that data to the SCM devices 414a-414c in the high capacity subsystem 414. As such, at block 808, the flush of the memory system cache begins by copying the cache data that was written to the performance memory subsystems prior to shutdown but not copied over high capacity memory subsystems at shutdown.

The method 800 then proceeds to decision block 810 where it is determined whether the copying is complete. In an embodiment, at decision block 810 the system determines whether the flush of the memory system cache is complete. If at decision block 810 it is determined that the copying is not completed, the method 800 proceeds to block 812 where cache data to-be-evicted from the volatile memory in the memory system cache is read. In an embodiment, the memory controllers 310 and 312 read cache data 406 and 410, respectively, from their performance subsystems 402 and 404, respectively. For example, the memory controller 310 may read the cache data 406 from the DRAM 504 in the NVDIMM-N(s) 402a-402c. The method 800 then proceeds to block 814 where the to-be-evicted data is written to the high capacity memory subsystem. In an embodiment, the memory controllers 310 and 312 write the cache data 406 and 410, respectively, that was read from the performance subsystems 402 and 404, respectively, to the high capacity memory subsystems 414 and 416, respectively. For example, the memory controller 310 may read the cache data 406 from the DRAM 504 in the NVDIMM-N(s) 402a-402c and write that cache data to the SCM devices 414a-414c.

The method 800 then proceeds to block 816 where the cache tracking databases in the memory controllers are updated. In an embodiment, at block 816, the memory controllers 310 and 312 update their respective cache tracking databases 310d and 312d with information detailing the operations taken during the copying of the cache data from the performance memory subsystems 402 and 404, respectively, to the high capacity memory subsystems 414 and 416, respectively. As such, the cache tracking databases 310d and 312d are kept up-to-date with the data transfer associated with the flush of the memory system cache. The method 800 then returns to decision block 810 to determine whether the copying is complete (e.g., whether the flush of the memory system cache is complete). One of skill in the art in possession of the present disclosure will recognize that the method 800 may loop through blocks 810, 812, 814, and 816 until the flush of the memory system cache is complete.

If at decision block 810 it is determined the copying is complete (e.g., whether the flush of the memory system cache is complete), the method 800 proceeds to block 818 where data is erased from the memory system cache. In an embodiment, at block 818 the processing system 204 may operate to erase data from the performance subsystems 402 and 404. For example, the BIOS in the processing system 204 may erase the data in the DRAM 504 of the NVDIMM-Ns 402a-402c/404a-404c/500. In an embodiment, the memory controllers 310/312 may initiate NVDIMMN ARM and ERASE actions. In some examples, the NVDIMM-N's 500 may perform a RESTORE operation on their flash memory 508 and the DRAM 504, perform an ARM operation and prepare for the next SAVE#, perform an ERASE operation on the flash memory 508, and perform a SAVE operation to write the DRAM 504 to the flash memory 504. However, one of skill in the art in possession of the present disclosure will recognize that other NVDIMM-N arming flows will fall within the scope of the present disclosure. The method 800 then proceeds to block 820 where operation is resumed. In an embodiment, at block 820 the operation of the computing device 200 may resume and be performed substantially as described above in the method 600. Thus, entering block 820, the cache data that was located in performance memory systems immediately prior to shutdown of the computing device (and copied to the persistent memory devices in the performance memory subsystems prior to that shutdown), has been copied to the high capacity memory subsystems. Furthermore, the cache tracking databases that detailed the locations and statuses of the cache data immediately prior to shutdown of the computing device (and that were copied to the persistent memory devices in the performance memory subsystems prior to that shutdown), have been retrieved by the memory controllers and updated as the memory system cache was flushed to copy the cache data to the high capacity memory subsystems. As such, the computing device may resume operations that include the storage and retrieval of data with respect to the memory system including the SCM devices operating in the memory mode as discussed above.

Thus, systems and methods have been described that provide an NVDIMM-N cache for SCM devices operating in memory mode, and operate to allow persistence in a memory system that includes those SCM devices by providing for the persistent storage of cache data that has yet to be copied to the SCM devices at shutdown, as well as cache tracking databases that detail the locations and statuses of the cache data. As such, upon restore of the computing device following a shutdown in which time may not be available to copy the cache data to the SCM devices (e.g., a power failure), that cache data may be restored in the memory system and accessed via the cache tracking databases. One of skill in the art in possession of the present disclosure will recognize that the systems and methods of the present disclosure provide substantial improvements over conventional SCM memory mode implementations that provide a volatile RDIMM/LRDIMM cache that can result in the loss of tens to hundreds of gigabytes of data stored in the volatile RDIMM/LRDIMM cache in the event of a power failure that does not allow the copying of that data to the SCM devices due to the performance limitations of those SCM devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Storage Class Memory (SCM) memory mode Non-Volatile Dual Inline Memory Module (NVDIMM-N) cache system, comprising:
    a Storage Class Memory (SCM) subsystem;
    a Non-Volatile Dual Inline Memory Module (NVDIMM-N) subsystem including at least one volatile memory device and at least one non-volatile memory device; and
    a memory controller that is coupled to the SCM subsystem and the NVDIMM-N subsystem, wherein the memory controller is configured to:
        write a plurality of data to the at least one volatile memory device in the NVDIMM-N subsystem and, in response, update a cache tracking database;
        write a first subset of the plurality of data to the SCM subsystem subsequent to the writing of the plurality of data to the at least one volatile memory device in the NVDIMM-N subsystem and, in response, update the cache tracking database; and
        receive a shutdown signal and, in response, copy the cache tracking database to the at least one volatile memory device in the NVDIMM-N subsystem, wherein the NVDIMM-N subsystem is configured to copy at least some of the plurality of data and the cache tracking database from the at least one volatile memory device in the NVDIMM-N subsystem to the at least one non-volatile memory device in the NVDIMM-N subsystem prior to a shutdown associated with the shutdown signal.

2. The system of claim 1, wherein the memory controller is configured to:
    erase the first subset of the plurality of data from the at least one volatile memory device in the NVDIMM-N subsystem in response to writing the subset of the plurality of data to the SCM subsystem, wherein the erasing of the first subsystem of the plurality of data from the at least one volatile memory device in the NVDIMM-N subsystem provides a second subset of the plurality of data on the at least one volatile memory device in the NVDIMM-N subsystem.

3. The system of claim 2, wherein the at least some of the plurality of data that is copied by the NVDIMM-N subsystem from the at least one volatile memory device in the NVDIMM-N subsystem to the at least one non-volatile memory device in the NVDIMM-N subsystem prior to the shutdown is the second subset of the plurality of data.

4. The system of claim 2, wherein the cache tracking database details storage locations and statuses of the first subset of the plurality of data on the SCM subsystem and the second subset of the plurality of data on the at least one volatile memory subsystem in the NVDIMM-N subsystem.

5. The system of claim 1, wherein the at least one volatile memory device in the NVDIMM-N subsystem includes at least one Dynamic Random Access Memory (DRAM) device, and the at least one non-volatile memory device in the NVDIMM-N subsystem includes at least one flash memory device.

6. The system of claim 1, wherein the NVDIMM-N subsystem is configured to:
    receive a restore signal subsequent to the shutdown and, in response, copy the at least some of the plurality of data and the cache tracking database from the at least one non-volatile memory device in the NVDIMM-N subsystem to the at least one volatile memory device in the NVDIMM-N subsystem, wherein the memory controller is configured to retrieve the cache tracking database from the at least one volatile memory device in the NVDIMM-N subsystem and copy the at least some of the plurality of data from the at least one volatile memory device in the NVDIMM-N subsystem to the SCM subsystem.

7. The system of claim 6, further comprising:
    a Basic Input/Output System (BIOS) that is configured to determine that the memory controller has copied the at least some of the plurality of data from the at least one volatile memory device in the NVDIMM-N subsystem to the SCM subsystem and, in response, erase the at least some of the plurality of data from the at least one volatile memory device in the NVDIMM-N subsystem.

8. An Information Handling System (IHS), comprising:
    a chassis;
    a memory system that is located in the chassis and that includes:

a Storage Class Memory (SCM) subsystem; and
a Non-Volatile Dual Inline Memory Module (NVDIMM-N) subsystem including at least one volatile memory device and at least one non-volatile memory device;
a processing system that is coupled to the memory system and that is configured to:
write a plurality of data to the at least one volatile memory device in the NVDIMM-N subsystem and, in response, update a cache tracking database;
write a first subset of the plurality of data to the SCM subsystem subsequent to the writing of the plurality of data to the at least one volatile memory device in the NVDIMM-N subsystem and, in response, update the cache tracking database; and
receive a shutdown signal and, in response, copy the cache tracking database to the at least one volatile memory device in the NVDIMM-N subsystem, wherein the NVDIMM-N subsystem is configured to copy at least some of the plurality of data and the cache tracking database from the at least one volatile memory device in the NVDIMM-N subsystem to the at least one non-volatile memory device in the NVDIMM-N subsystem prior to a shutdown associated with the shutdown signal.

9. The IHS of claim 8, wherein the processing system is configured to:
erase the first subset of the plurality of data from the at least one volatile memory device in the NVDIMM-N subsystem in response to writing the subset of the plurality of data to the SCM subsystem, wherein the erasing of the first subsystem of the plurality of data from the at least one volatile memory device in the NVDIMM-N subsystem provides a second subset of the plurality of data on the at least one volatile memory device in the NVDIMM-N subsystem.

10. The IHS of claim 9, wherein the at least some of the plurality of data that is copied by the NVDIMM-N subsystem from the at least one volatile memory device in the NVDIMM-N subsystem to the at least one non-volatile memory device in the NVDIMM-N subsystem prior to the shutdown is the second subset of the plurality of data.

11. The IHS of claim 9, wherein the cache tracking database details storage locations and statuses of the first subset of the plurality of data on the SCM subsystem and the second subset of the plurality of data on the at least one volatile memory subsystem in the NVDIMM-N subsystem.

12. The IHS of claim 8, wherein the NVDIMM-N subsystem is configured to:
receive a restore signal subsequent to the shutdown and, in response, copy the at least some of the plurality of data and the cache tracking database from the at least one non-volatile memory device in the NVDIMM-N subsystem to the at least one volatile memory device in the NVDIMM-N subsystem, wherein the processing system is configured to retrieve the cache tracking database from the at least one volatile memory device in the NVDIMM-N subsystem and copy the at least some of the plurality of data from the at least one volatile memory device in the NVDIMM-N subsystem to the SCM subsystem.

13. The IHS of claim 12, further comprising:
a Basic Input/Output System (BIOS) that is configured to determine that the processing system has copied the at least some of the plurality of data from the at least one volatile memory device in the NVDIMM-N subsystem to the SCM subsystem and, in response, erase the at least some of the plurality of data from the at least one volatile memory device in the NVDIMM-N subsystem.

14. A method for providing a Storage Class Memory (SCM) memory mode Non-Volatile Dual Inline Memory Module (NVDIMM-N) cache, comprising:
writing, by a memory controller to at least one volatile memory device in an Non-Volatile Dual Inline Memory Module (NVDIMM-N) subsystem, a plurality of data and, in response, updating a cache tracking database;
writing, by the memory controller to an Storage Class Memory (SCM) subsystem subsequent to the writing of the plurality of data to the at least one volatile memory device in the NVDIMM-N subsystem, a first subset of the plurality of data and, in response, updating the cache tracking database;
receiving, by the memory controller, a shutdown signal and, in response, copying the cache tracking database to the at least one volatile memory device in the NVDIMM-N subsystem; and
copying, by the NVDIMM-N subsystem, at least some of the plurality of data and the cache tracking database from the at least one volatile memory device in the NVDIMM-N subsystem to the at least one non-volatile memory device in the NVDIMM-N subsystem prior to a shutdown associated with the shutdown signal.

15. The method of claim 14, further comprising:
erasing, by the memory controller, the first subset of the plurality of data from the at least one volatile memory device in the NVDIMM-N subsystem in response to writing the subset of the plurality of data to the SCM subsystem, wherein the erasing of the first subsystem of the plurality of data from the at least one volatile memory device in the NVDIMM-N subsystem provides a second subset of the plurality of data on the at least one volatile memory device in the NVDIMM-N subsystem.

16. The method of claim 15, wherein the at least some of the plurality of data that is copied by the NVDIMM-N subsystem from the at least one volatile memory device in the NVDIMM-N subsystem to the at least one non-volatile memory device in the NVDIMM-N subsystem prior to the shutdown is the second subset of the plurality of data.

17. The method of claim 15, wherein the cache tracking database details storage locations and statuses of the first subset of the plurality of data on the SCM subsystem and the second subset of the plurality of data on the at least one volatile memory subsystem in the NVDIMM-N subsystem.

18. The method of claim 14, wherein the at least one volatile memory device in the NVDIMM-N subsystem includes at least one Dynamic Random Access Memory (DRAM) device, and the at least one non-volatile memory device in the NVDIMM-N subsystem includes at least one flash memory device.

19. The method of claim 14, further comprising:
receiving, by the NVDIMM-N subsystem, a restore signal subsequent to the shutdown and, in response, copying the at least some of the plurality of data and the cache tracking database from the at least one non-volatile memory device in the NVDIMM-N subsystem to the at least one volatile memory device in the NVDIMM-N subsystem; and
retrieving, by the memory controller, the cache tracking database from the at least one volatile memory device in the NVDIMM-N subsystem and copying the at least some of the plurality of data from the at least one volatile memory device in the NVDIMM-N subsystem to the SCM subsystem.

20. The method of claim 19, further comprising determining, by a Basic Input/Output System (BIOS), that the memory controller has copied the at least some of the plurality of data from the at least one volatile memory device in the NVDIMM-N subsystem to the SCM subsystem and, in response, erasing the at least some of the plurality of data from the at least one volatile memory device in the NVDIMM-N subsystem.

\* \* \* \* \*